(12) United States Patent
Hashimoto

(10) Patent No.: US 6,654,839 B1
(45) Date of Patent: Nov. 25, 2003

(54) INTERRUPT CONTROLLER, ASIC, AND ELECTRONIC EQUIPMENT

(75) Inventor: Yoshiaki Hashimoto, Taukuba (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/700,645
(22) PCT Filed: Mar. 23, 2000
(86) PCT No.: PCT/JP00/01768
§ 371 (c)(1),
(2), (4) Date: Nov. 17, 2000

(30) Foreign Application Priority Data

Mar. 23, 1999 (JP) .......................................... 11-078067

(51) Int. Cl.[7] .............................................. G06F 13/24
(52) U.S. Cl. ....................................... 710/269; 710/260
(58) Field of Search ................................ 710/260, 269, 710/266, 48; 712/214, 244; 361/683

(56) References Cited

U.S. PATENT DOCUMENTS

| 4,628,449 A | | 12/1986 | Zardiackas |
| 5,007,082 A | * | 4/1991 | Cummins |
| 5,828,891 A | | 10/1998 | Benayoun et al. |
| 5,944,816 A | * | 8/1999 | Dutton et al. |
| 6,378,023 B1 | * | 4/2002 | Christie et al. |

FOREIGN PATENT DOCUMENTS

| JP | 52-32647 | 3/1977 |
| JP | 60-57440 | 4/1985 |
| JP | 63-165929 | 7/1988 |
| JP | 1986000314107 | 7/1988 |
| JP | 1-311353 | 12/1989 |

* cited by examiner

Primary Examiner—Gopal C. Ray
(74) Attorney, Agent, or Firm—Oliff & Berridge, PLC (57) ABSTRACT

An interrupt controller, ASIC, and electronic equipment are provided that make it possible to branch directly to interrupt processing routines at a plurality of locations. When an interrupt controller receives one of IR0 to IR31, it generates an IRQ for a CPU; traps an address AD from the CPU; and after determining that a read instruction for an interrupt vector has been executed, it generates a vector table address VTA corresponding to the interrupt factor with respect to a memory in which the interrupt vector table is stored. The CPU and the memory are connected to a higher-performance ASB, the interrupt controller is connected to a lower-performance APB. A selector selects one of the AD and the VTA, based on a signal from the interrupt controller. A first mode in which the VTA is generated and a second mode in which the interrupt vector is read are switchable.

15 Claims, 9 Drawing Sheets

INTERRUPT CONTROLLER, ASIC, AND ELECTRONIC EQUIPMENT

TECHNICAL FIELD

The present invention relates to an interrupt controller, an ASIC, and electronic equipment.

BACKGROUND OF ART

Embedded type CPUs (microprocessors) have recently been placed in the limelight. The objective of an embedded type CPU is that is should be incorporated as an ASIC core. In other words, the user uses such a CPU as an ASIC core, and components other than the CPU can be designed by the user, using gate arrays or the like.

One type of CPU that is becoming well known as the embedded type CPU is the ARM (Advanced RISC Machines) produced by ARM Ltd. This ARM is an inexpensive RISC type of CPU that is small, has a low power consumption, but enables high-speed throughput. It is expected that ASICs using such ARMs as cores will be suitable for incorporation into electronic equipment such as portable telephones and GSM devices.

However, various technical problems relating to interrupt processing have been identified with these ARM devices, as described below.

Figure 1:
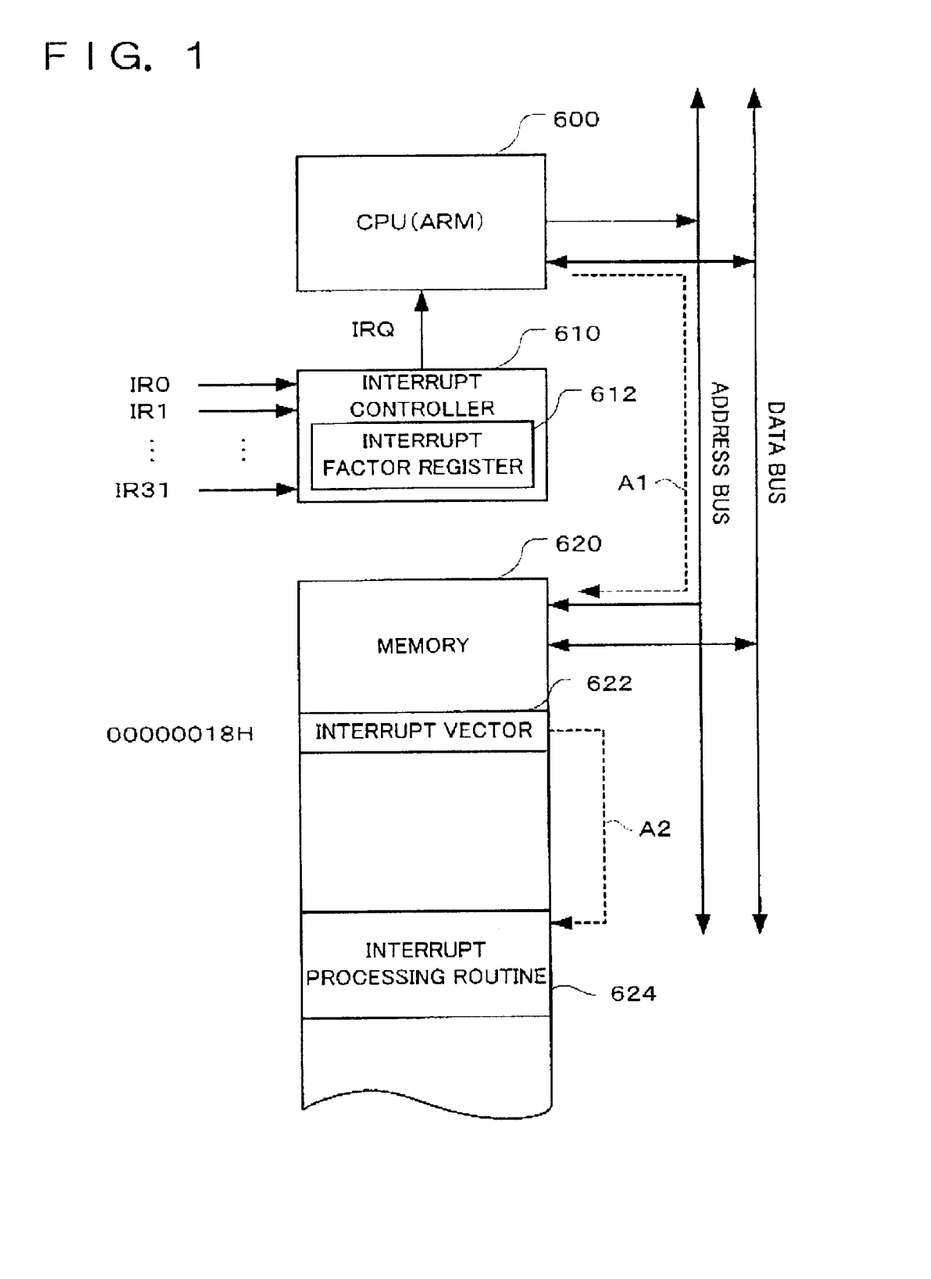
FIG. 1 is illustrative of the standard operation of an ARM device during interrupt processing.

The standard operation of an ARM during interrupt processing is shown in FIG. 1, by way of example.

(A) When one of interrupt requests IR0 to IR31 is input to an interrupt controller 610 from the outside, an interrupt factor register 612 within the interrupt controller 610 saves the interrupt factor. The interrupt controller 610 generates an interrupt request IRQ (a normal-level interrupt request) to inform a CPU (ARM) 600 that there is an external interrupt request.

(B) On receiving the IRQ, the CPU 600 reads an interrupt vector 622 that is stored at a vector address (00000018H) in a memory 620, as shown at A1 in FIG. 1. An interrupt processing routine (interrupt handler) 624 having a start address specified by the interrupt vector 622 is activated, as shown at A2.

(C) The activated interrupt processing routine 624 checks the interrupt factor that is stored in the interrupt factor register 612. Subsequent processing depends on this interrupt factor.

In this ARM device, only one vector address (storage address for an interrupt vector) can be specified (00000018H). The hardware can therefore branch only to the interrupt processing routine 624 at one location, so that branching to interrupt processing routines at a plurality of locations can only be done by software means within the interrupt processing routine 624.

Japanese Patent Application Laid-Open No. 63-165929 discloses a conventional technique for incorporating an interrupt vector table into the interrupt controller. When an external interrupt is generated with this conventional technique, the interrupt controller issues an interrupt request to inform the CPU. When the interrupt controller receives an ACK signal from the CPU, it outputs an interrupt vector that is stored in an interrupt vector table to the CPU through a bus.

Since the interrupt vector table is provided within the interrupt controller with this conventional technique, however, various problems occur such as an increase in the size of the hardware of the interrupt controller and an increase in cost. There are also further problems, such as increasing complexity of memory control and bus control.

DISCLOSURE OF INVENTION

The present invention was devised in the light of the above described technical problems, with the objective of providing an interrupt controller, ASIC, and electronic equipment that make it possible to branch directly to interrupt processing routines at a plurality of locations.

The present invention was devised to solve the above-described technical problems, by providing an interrupt controller for controlling interrupt, comprising:

means for generating an interrupt request to a processor when an external interrupt request is received;

means for trapping an address from the processor, and for determining whether or not the processor which receives the interrupt request has executed a read instruction for an interrupt vector, based on the trapped address; and means for generating a vector table address corresponding to a factor of the external interrupt request, with respect to a memory storing an interrupt vector table, when it is determined that the read instruction for the interrupt vector has been executed.

This aspect of the present invention generates an interrupt request to a processor when an external interrupt request is received. On reception of this interrupt request, the processor executes a read instruction for an interrupt vector (the start address of an interrupt processing routine). In such a case, the interrupt controller of the present invention traps an address from the processor then determines whether or not the read instruction for the interrupt vector has been executed, based on the thus-trapped address. When it determines that the instruction has been executed, it then outputs a vector table address (the storage address of an interrupt vector table) corresponding to the factor of the received external interrupt request, to a memory. This causes the output of the interrupt vector that corresponds to the factor of the external interrupt request, from the memory that stores the interrupt vector table. This configuration of the present invention makes it possible to branch directly to interrupt processing routines at a plurality of locations, even when the processor itself can only specify one vector address for the interrupt vector. As a result, it becomes possible to increase the speed of processing and simplify the programming.

In the present invention, the processor and the memory may be connected to a higher-performance first bus and the interrupt controller may be connected to a lower-performance second bus. The interrupt vector table in accordance with the present invention is stored in a memory, not in the interrupt controller. It is therefore possible to read the interrupt vector table from a memory over the higher-performance first bus, even if the interrupt controller is connected to the lower-performance second bus. As a result, the speed of the interrupt processing can be increased, even though the hardware of the interrupt controller can be made smaller.

The interrupt controller of the present invention may generate an address switching signal output to a selector which selects and outputs one of the address from the processor and the vector table address from the interrupt controller. This configuration makes it possible to minimize signal delays for addresses from the processor during normal operation.

The present invention may further comprise a base register which stores a base address of the vector table address, and the interrupt controller may generate the vector table address based on the factor of the external interrupt request and the base address from the base register. This configuration makes it possible to make the device more convenient to the user, by enabling the storage of a series of interrupt vectors at addresses within a memory as desired by the user.

The present invention may comprise a first mode and a second mode which are switchable therebetween, processing that traps the address from the processor and generates the vector table address being enabled in the first mode and being disabled in the second mode. This makes it possible to respond to demands from users who wish for operation in a first mode in which the vectortable address is generated and also to demands from users who wish for operation in a standard second mode.

An ASIC in accordance with the present invention comprises one of the above described interrupt controllers; the processor which executes instructions; and the memory which stores at least the interrupt vector table. This configuration makes it possible to provide an ASIC that responds demands by various levels of users.

Electronic equipment in accordance with the present invention comprises the above described ASIC; input means for inputting data; and output means which outputs at least one of an image and a sound under a control of the ASIC. This configuration makes it possible to branch directly and immediately to an interrupt processing routine that corresponds to any of a plurality of operations done by using the input means, by way of example. This simplifies the program for operating the electronic equipment and also increases the speed of processing.

BEST MODE FOR CARRYING OUT THE INVENTION

A preferred embodiment of the present invention is described below with reference to the accompanying drawings.

1. Interrupt Controller

Figure 2:
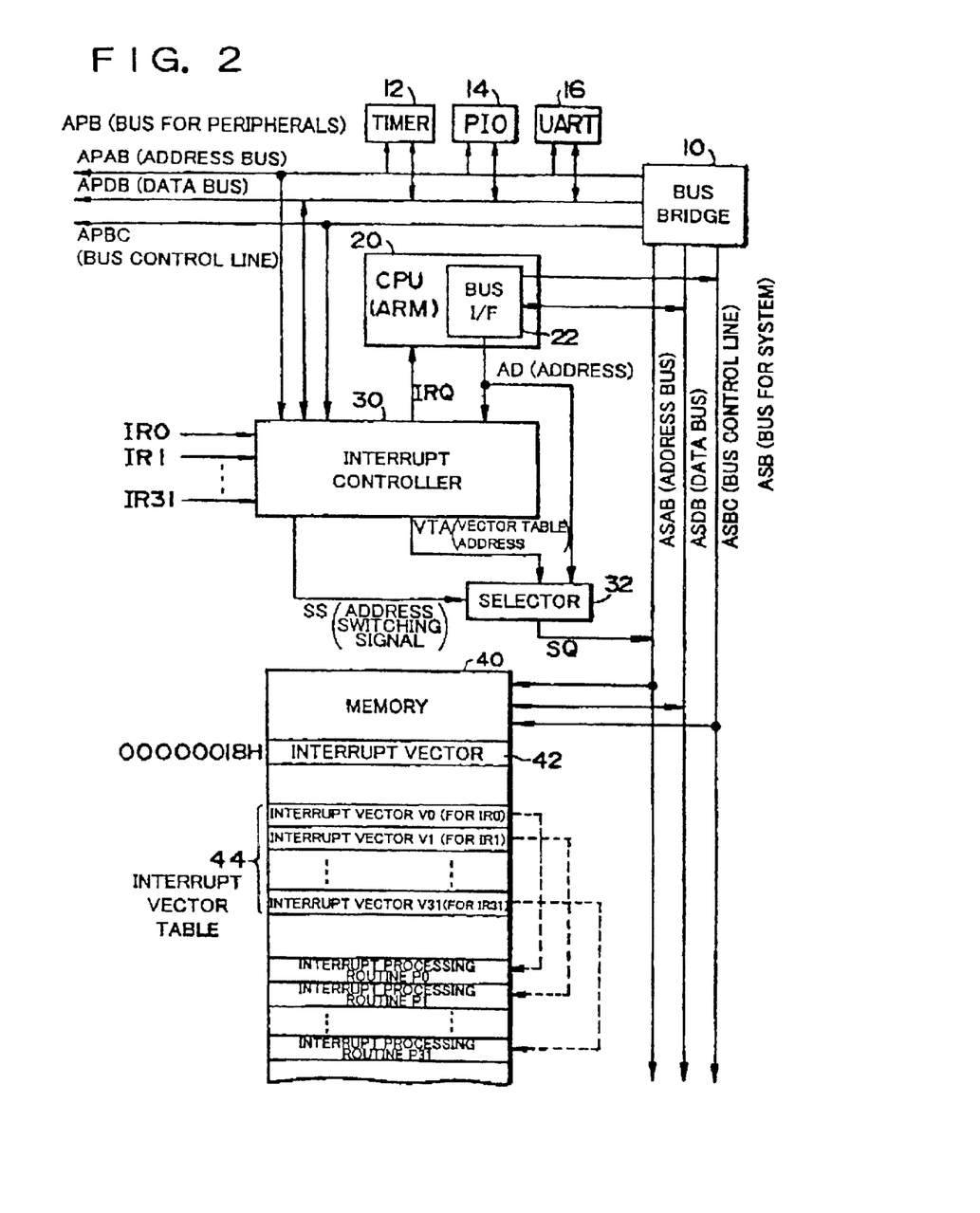
FIG. 2 is a block diagram of an interrupt controller in accordance with an embodiment of the present invention, together with peripheral devices thereof.

A block diagram of an interrupt controller and its peripheral devices is shown in FIG. 2.

An ARM device uses a bus architecture called the advanced microcontroller bus architecture (AMBA) in which an advanced system bus (ASB) and advanced peripheral bus (APB) are connected by a bus bridge 10.

The ASB that is a bus for the system comprises an address bus ASAB, a data bus ASDB, and a bus control line ASBC. The ASB is a higher-performance bus which is suitable as a bus for connection to a CPU 20 and a memory 40 that require higher processing speeds with this ASB, bus control using the ASBC becomes complicated.

The APB that is a bus for peripherals comprises an address bus APAB, a data bus APDB, and a bus control line APBC. The APB is a lower-performance bus in comparison with the ASB, but it is superior to the ASB in terms of a lower power consumption. The bus control that use the APBC are simpler than those of the ASB. The APB is connected to various I/O devices such as an interrupt controller 30, a timer 12, a PIO 14, and a UART 16, that do not require such a higher processing speed.

The role of a CPU (broadly speaking, a processor) 20 is to execute various instructions, and an ARM is used as the CPU 20 in this embodiment of the invention. The CPU 20 comprises a bus I/F section 22 that functions as an interface with the address bus ASAB, the data bus ASDB, and the bus control line ASBC.

The interrupt controller 30 performs various processes, such as detecting interrupt requests IR0 to IR31 from the exterior and generating an IRQ when there is an external interrupt request, to inform the CPU 20. The interrupt controller 30 of this embodiment of the invention performs processing to generate a vector table address VTA (the storage address of an interrupt vector table 44) and an address switching signal SS.

The memory 40 stores the interrupt vector table 44. In other words, the interrupt vector table 44 is provided within the memory 40 in this embodiment of the invention, whereas the interrupt vector table is provided in the interrupt controller of the conventional technique disclosed by Japanese Patent Application Laid-Open No. 63-165929.

The operation of this embodiment of the invention will now be described in a simple manner.

(1) When the interrupt controller 30 receives one of the interrupt requests IR0 to IR31 from the exterior, it generates an interrupt request IRQ to the CPU 20 to inform the CPU 20 that there is an external interrupt request.

(2) When the CPU 20 is capable of switching to interrupt processing on reception of the IRQ, it executes a read instruction for an interrupt vector 42 that is stored at vector address (00000018H).

(3) The interrupt controller 30 traps an address AD from the CPU 20. The determination as to whether or not the CPU 20 has executed the read instruction for the interrupt vector 42 is based on this trapped address.

(4) When the interrupt controller 30 has determined that the read instruction for the interrupt vector 42 has been executed, it generates the vector table address VTA that corresponds to the factor of the external interrupt request that was received in step (1). The address switching signal SS are controlled so that a selector 32 selects the vector table address VTA instead of the address AD from the CPU 20, for output to SQ. This ensures that the vector table address VTA (the storage address of the interrupt vector table 44) generated by the interrupt controller 30 is output to the address bus ASAB, instead of the vector address (00000018H) from the CPU 20.

The above procedure ensures that the CPU 20 actually reads one of interrupt vectors V0 to V31, even if the intention was to read the interrupt vector 42. In other words, interrupt vector V0 is read when external interrupt request IR0 has been received in step (1), V1 is read when IR1 has been received, V2 is read when IR2 has been received, . . . all the way up to V31 is read when IR31 has been received.

When the interrupt vector V0 has been read, an interrupt processing routine P0 having a start (head) address that is specified by V0 is activated; when V1 has been read, an interrupt processing routine P1 having a start address that is specified by V1 is activated; . . . and when V31 has been read, an interrupt processing routine P31 having a start address that is specified by V31 is activated. Note that FIG. 2 shows a case in which the interrupt vector 42 is stored at (00000018H), to simplify the description, but it is not necessary to store the interrupt vector 42 always at (00000018H).

This embodiment of the invention as described above makes it possible to branch directly to the interrupt processing routines P0 to P31 at a plurality of locations, even if the CPU (ARM) 20 that can specify only one vector address (00000018H) is used.

In other words, with ARM, it is only possible to branch to the interrupt processing routine 624 at one location with the hardware shown in FIG. 1. The only way to branch to interrupt processing routines at a plurality of locations is to use the interrupt processing routine 624, which was activated at first, for branching in a software manner. When external interrupt requests IR0 to IR31 have been input, therefore, it is not possible to branch immediately to the interrupt processing routines corresponding to each of these external interrupt request.

In contrast thereto, the present invention makes it possible to implement direct and immediate branching to interrupt processing routines P0 to P31 at a plurality of locations, for each interrupt factor, such that the processing branches directly to the interrupt processing routine P0 when the external interrupt request IR0 has been input or to P1 when IR1 has been input, by way of example. As a result, it is possible to increase the processing speed, and to make programs more compact and simpler. Moreover, the CPU 20 can operate in an ordinary manner such that it simply performs an operation to read the interrupt vector 42 at (00000018H). It is therefore possible to branch directly to interrupt processing routines at a plurality of locations, regardless of any changes in other parts of the system.

Figure 3:
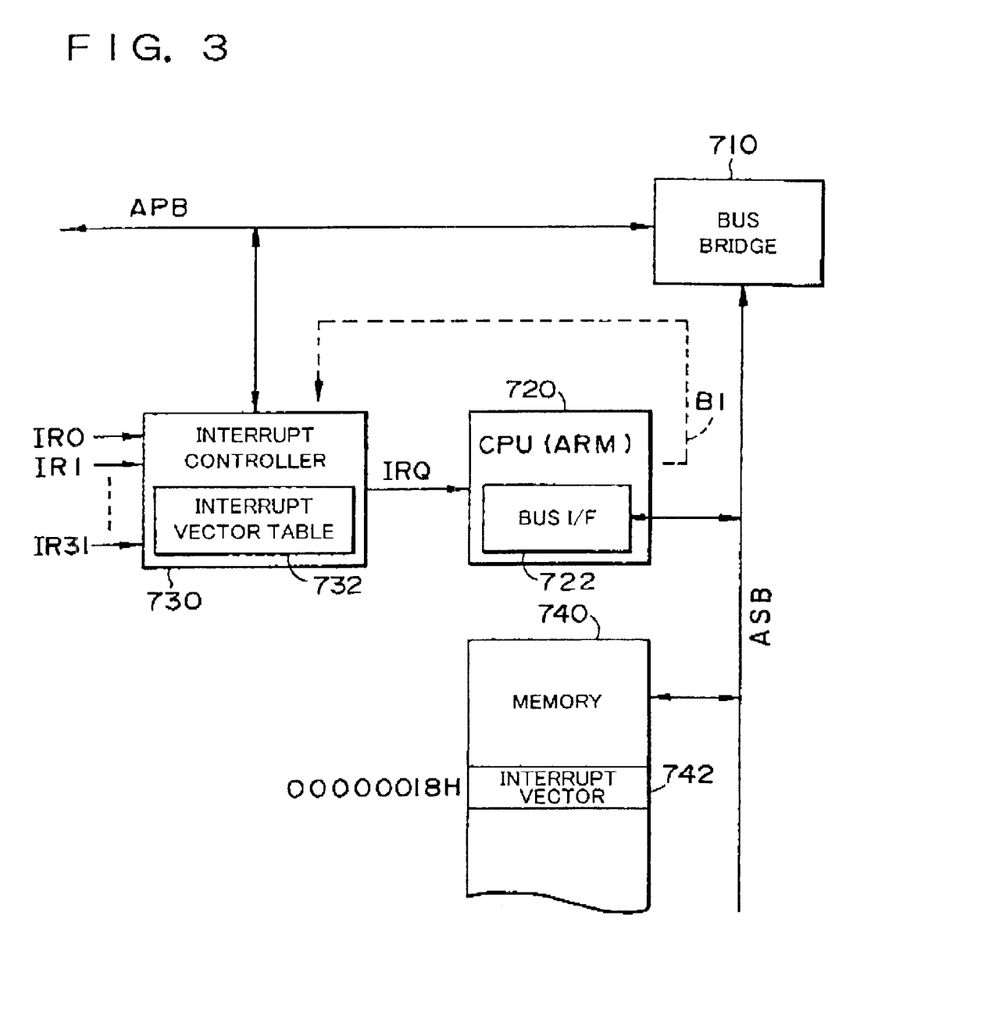
FIG. 3 shows an example in which a conventional technique is employed, as a comparative example.
Figure 4:
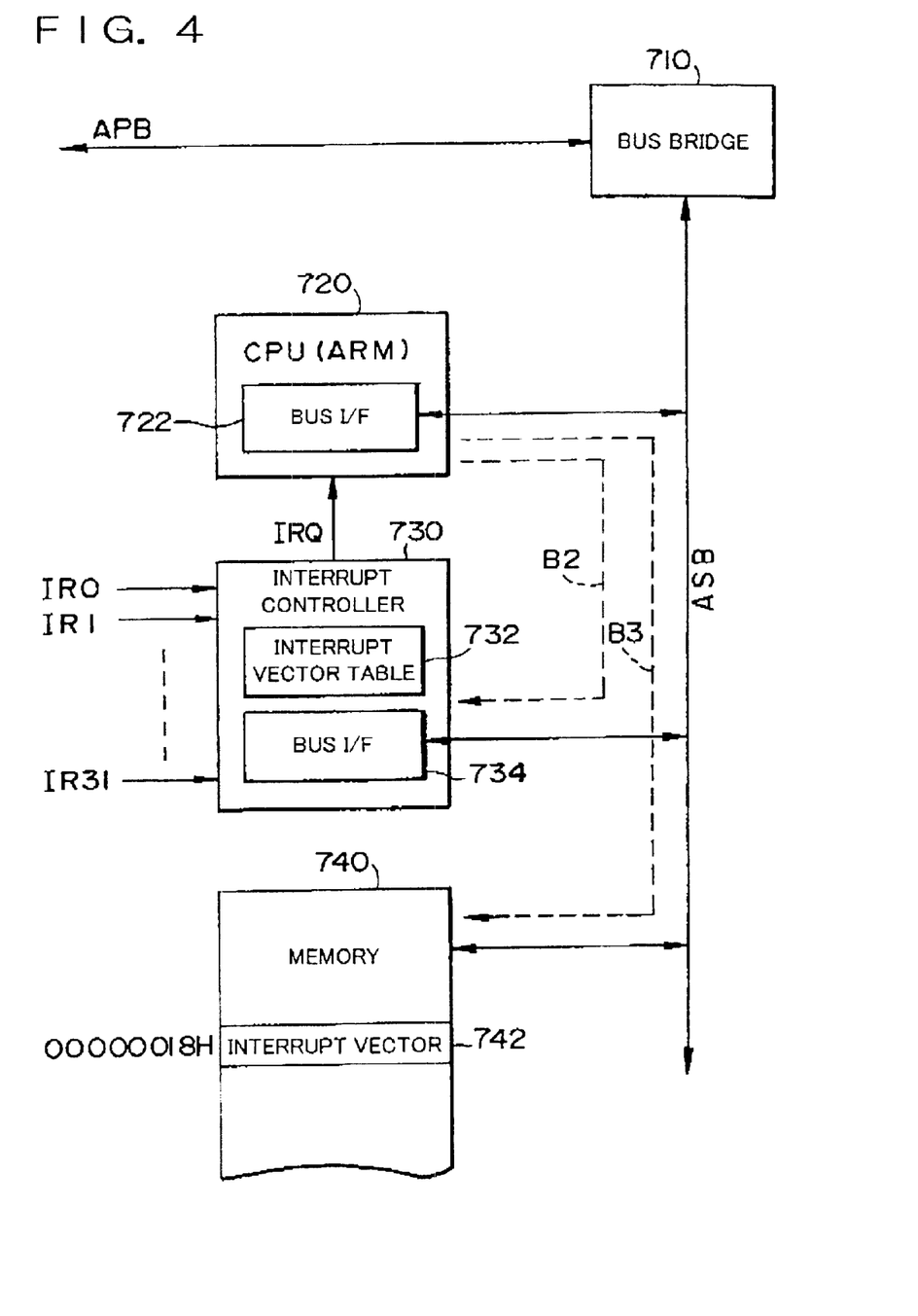
FIG. 4 shows another example in which a conventional technique is employed, as a comparative example.

Comparative examples of the present invention are shown in FIGS. 3 and 4, as examples of the application of the conventional technique disclosed by Japanese Patent Application Laid-Open No. 63-165929.

In the configuration shown in FIG. 2, the interrupt vector table 44 was provided in the memory 40, but in the configuration shown in FIG. 3, an interrupt vector table 732 is provided in an interrupt controller 730. The interrupt controller 730 of FIG. 3 is connected to the lower-performance APB. In order for a CPU 720 to read the interrupt vector table 732, therefore, it is necessary for it to read through the ASB, a bus bridge 710, and the APB, as shown at B1 in FIG. 3. This obstructs any speeding up of the interrupt processing. In addition, since the interrupt vector table 732 is provided within the interrupt controller 730, the hardware configuration of the interrupt controller 730 becomes larger.

In contrast thereto, the interrupt vector table 44 is provided in the memory 40 in the embodiment of the present invention that is shown in FIG. 2. The CPU 20 can therefore read the interrupt vector table 44 at high speed from the memory 40, through the ASB. There is therefore no obstruction to increasing the speed of the interrupt processing, even if the interrupt controller 30 is connected to the APB. Because the interrupt vector table 44 is provided in the memory 40, the hardware of the interrupt controller 30 can be made smaller than that shown in FIG. 2. When the configuration is such that the interrupt vector table 44 is stored in a surplus region of the memory 40, it is possible to prevent a state in which the memory 40 becomes too large.

In FIG. 4, the interrupt controller 730 is connected to the higher-performance ASB. When the interrupt controller 730 is connected to the ASB in this manner, the CPU 720 can read the interrupt vector table 732 from the interrupt controller 730 through the ASB, as shown at B2 in FIG. 4, which is faster than in the configuration of FIG. 3.

When the interrupt controller 730 is connected to the ASB as shown in FIG. 4, however, the hardware of a bus I/F section 734 within the interrupt controller 730 becomes larger. It becomes necessary for the ASB to have more advance bus control than the APB.

On receiving the IRQ the CPU 720 proceeds to read an interrupt vector 742 from a memory 740. To ensure that the CPU 720 reads the interrupt vector table 732 correctly, therefore, it is necessary to impose control such that operation of the memory 740 is suppressed during the reading of the interrupt vector table 732. This leads to problems concerning the complexity of memory control and bus control.

In contrast thereto, the interrupt controller 30 of the present invention is connected to the APB in the usual manner, as shown in FIG. 2. Since simple bus control will suffice, it is possible to prevent a situation in which the hardware of the interrupt controller 30 increases in size. Since the interrupt vector table 44 is provided in the memory 40, it is not necessary to impose control to suppress the operation of the memory 40 during the reading of the interrupt vector table 44. It is therefore possible to prevent the situation in which memory control and bus control become more complex.

Figure 5:
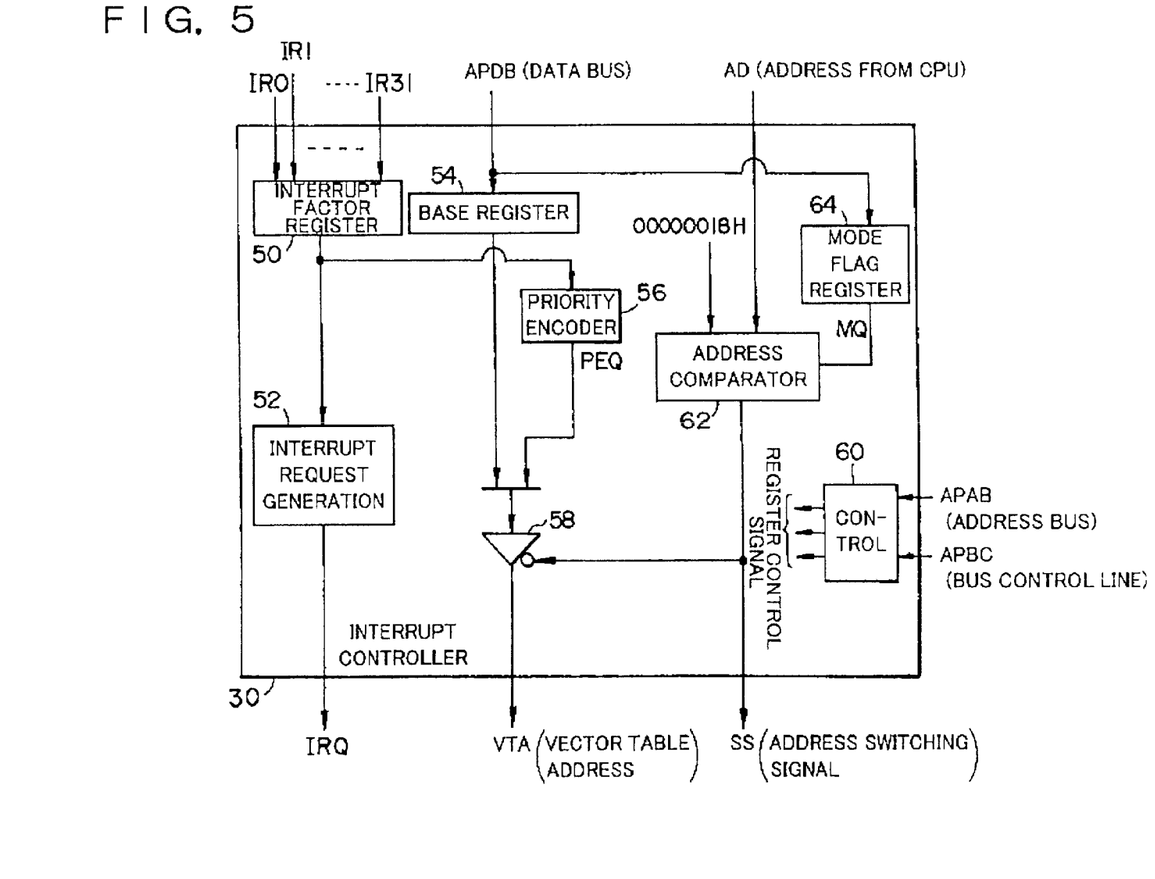
FIG. 5 shows a detailed example of the structure of the interrupt controller.

The description now turns to a specific structural example of the interrupt controller 30, with reference to FIG. 5.

An interrupt factor register 50 is a register that is used when the external interrupt requests IR0 to IR31 are input, to hold the corresponding interrupt factors. More specifically, the interrupt factor register 50 holds the signal levels of IR0 to IR31.

An interrupt request generation section 52 is designed to generate an interrupt request IRQ with respect to the CPU 20, based on the interrupt factors stored in the interrupt request register 50. In other words, when one of the external interrupt requests IR0 to IR31 is input, an IRQ is generated to inform the CPU 20 that an external interrupt request has been input.

A base register 54 is a register for storing the higher-order bits to be a base address of the vector table address VTA. This base register 54 is connected to the data bus (APDB) so that the CPU 20 can access it. The user can therefore write any desired base address into the base register 54. This enables the user to allocate the series of interrupt vectors V0 to V31 at the desired addresses within the memory 40. As a result, the programming can be made more compact and can be simplified, and also the convenience to the user is increased.

A priority encoder 56 generates the lower-order bits of the vector table address VTA, based on the interrupt factor from the interrupt factor register 50. In other words, the vector table address VTA is created by linking the base address (higher-order bits) from the base register 54 and the lower-order bits from the priority encoder 56. Note that when a plurality of the external interrupt requests IR0 to IR31 is input, the lower-order bits of the vector table address VTA corresponding to the interrupt factor with the highest priority are output from the priority encoder 56.

A control section 60 receives signals through the address bus APAB and the bus control line APBC, and generates various register control signals.

An address comparator 62 traps the address AD from the CPU 20 and compares that AD with (00000018H). When the AD and (00000018H) match, the address switching signal SS that is an output from the address comparator 62 goes L (low) level. This makes a tristate buffer 58 conductive and causes the vector table address VTA to be output to the selector 32 of FIG. 2.

A mode flag register 64 is a register storing a mode flag for switching between a first mode (a mode which enables the processing for trapping the address from the CPU 20 and generating the vector table address VTA) and a second mode (a mode in which that processing is disabled). In the first mode, for example, an output MQ of the mode flag register 64 goes L level and the comparison operation of the address comparator 62 is enabled. In the second mode, on the other hand, MQ goes H (high) level, the comparison operation of the address comparator 62 is disabled, and the output SS of the address comparator 62 is fixed at H level. This ensures that the tristate buffer 58 is always non-conductive and also ensures that the selector 32 in FIG. 2 always selects the address AD from the CPU 20 and outputs it.

This mode flag register 64 is connected to the data bus APDB and can be accessed freely by the CPU 20 It is therefore possible to use this mode flag register 64 to switch readily between the first mode (in which the vector table address VTA is generated and the interrupt vector table 44 is read by the CPU 20) and the second mode (in which the interrupt vector 42 is read by the CPU 20 from (00000018H) in the usual manner). As a result, it is possible to satisfy both the demands of a user who wishes to operate in the first mode and a user who wishes to operate in the standard ARM operating mode, by switching the mode flag register 64 but without modifying the hardware.

Figure 6:
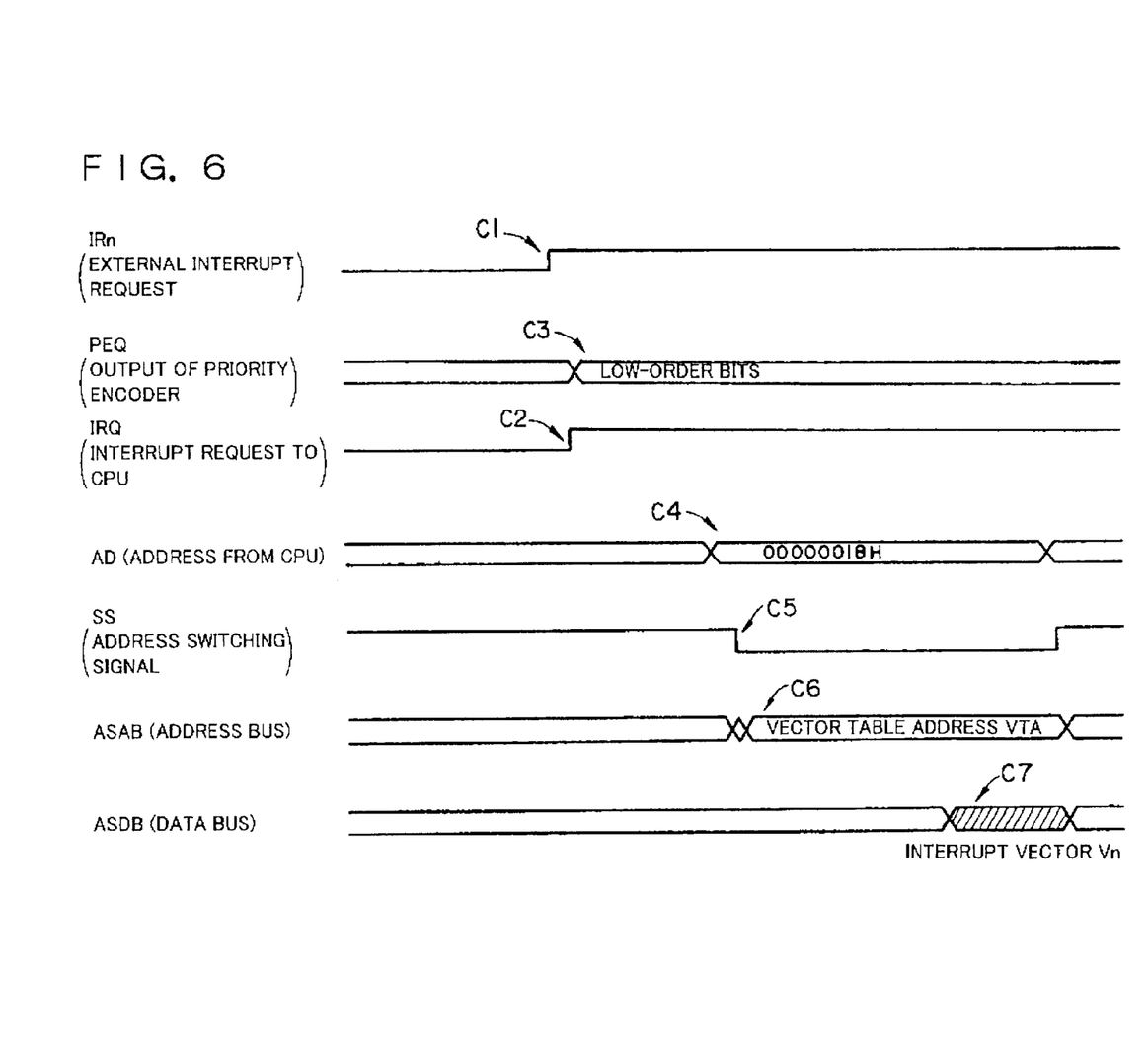
FIG. 6 is a signal waveform chart illustrating the operation of the interrupt controller.

The description now turns to the operation of the interrupt controller 30 of FIG. 5, with reference to the signal waveform chart shown in FIG. 6.

When the signal level of an external interrupt request IRn (where n=0 to 31) goes from L level to H level, as shown at C1 in FIG. 6, the signal level after the change is held in the interrupt factor register 50. Then the signal level of the interrupt request IRQ to the CPU 20 goes from L level to H level, as shown at C2, and the lower-order bits of the vector table address VTA are generated by the priority encoder 56, as shown at C3.

When the CPU 20 that has received the interrupt request IRQ outputs (00000018H) to the address AD, as shown at C4, the comparison operation is performed by the address comparator 62, and the address switching signal SS goes from E level to L level, as shown at C5. This makes the tristate buffer 58 go conductive and the vector table address VTA is selected by the selector 32 for output. As a result, the vector table address VTA is output over the address bus ASAB instead of (00000018H) from the CPU 20, as shown at C6. This causes the reading of an interrupt vector Vn (the interrupt vector corresponding to IRn) from the memory 40, as shown at C7, for output over the data bus ASDB. This enables direct branching to an interrupt processing routine Pn.

2. Microcomputer (ASIC)

Figure 7:
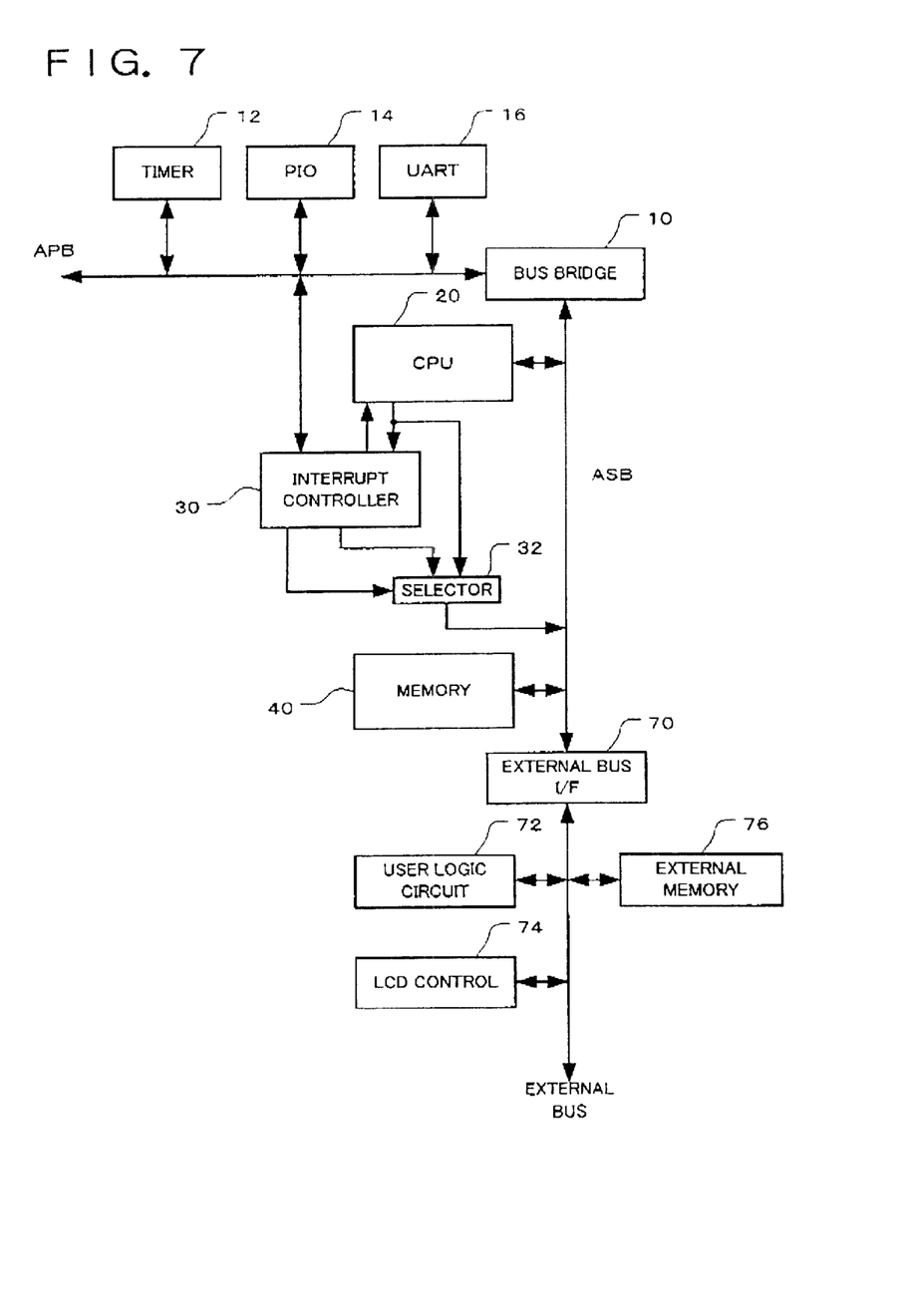
FIG. 7 shows an example of the structure of a microcomputer (ASIC) that uses the interrupt controller of the embodiment of the present invention.

An example of a block diagram of a microcomputer (broadly peaking, an ASIC) that comprises the interrupt controller 30 of the present invention is shown in FIG. 7.

The timer 12, the PIO 14, the UART 16, and the interrupt controller 30 of the present invention are connected to the bus APB. The CPU 20 and the memory 40 are connected to a bus ASB that is connected to the bus APB by the bus bridge 10.

The bus ASB is connected to an external bus by an external bus I/F section 70. A user logic circuit section 72, an LCD control section 74, and an external memory 76 are connected to this external bus.

In this case, the user logic circuit section 72 is a block formed of circuits that the user has designed by using components such as gate arrays. This provision of the user logic circuit section 72 makes it possible to implement microcomputers with different specifications for different users.

The LCD control section 74 is designed to create the various signals for controlling the display of the LCD. The provision of this LCD control section 74 makes it possible to implement the creation of a microcomputer that is suitable for a portable telephone or GSM. The external memory 76 is a memory that is provided outside the device, and the functions thereof can be implemented by hardware such as RAM or ROM.

The microcomputer of FIG. 7 makes it possible to provide a microcomputer that conforms to any specifications that users want. In particular, this embodiment of the invention enables switching between a first mode in which a plurality of vector table addresses are generated and a second mode in which the ARM operates as normal, by rewriting the mode flag register 64 of FIG. 5 and without modifying the hardware. It is therefore possible to provide microcomputers that answer demands by a wider range of users.

3. Electronic Equipment

Figure 8:
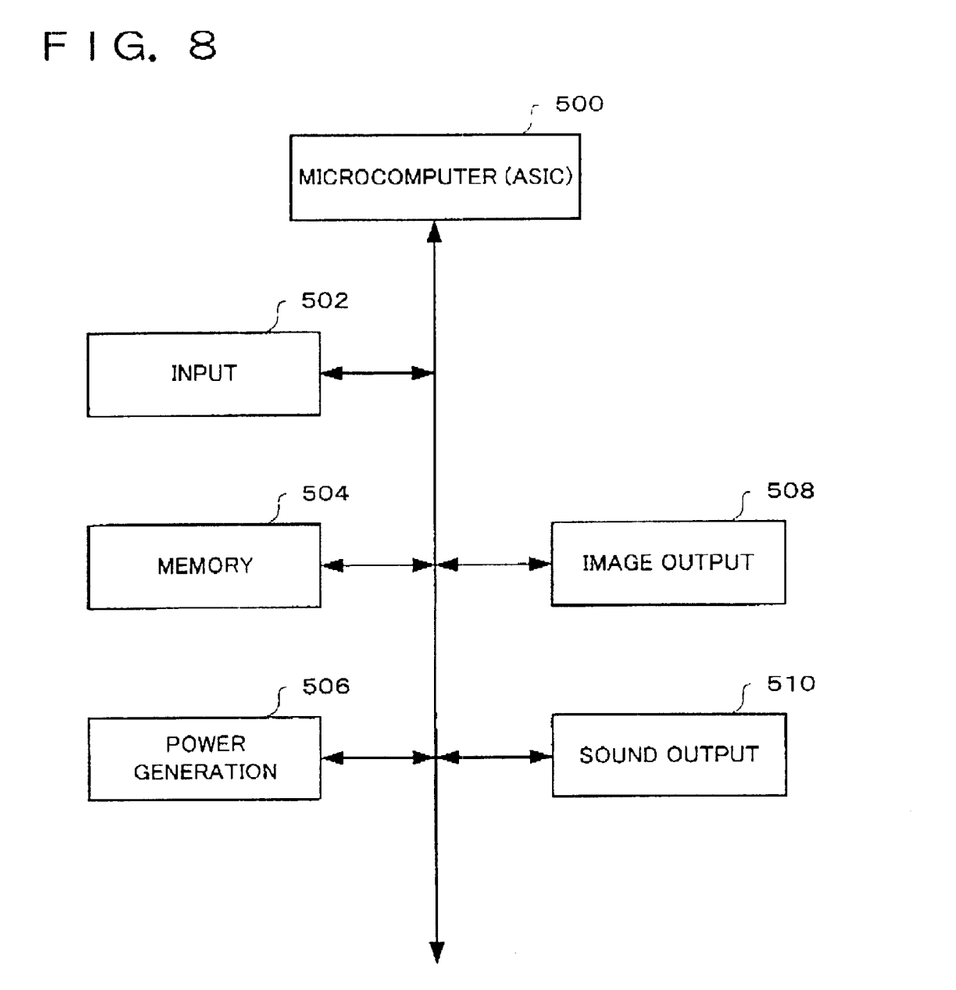
FIG. 8 shows an example of a block diagram of electronic equipment that incorporates the microcomputer of FIG. 7.

An example of a block diagram of electronic equipment that comprises the microcomputer (ASIC) of FIG. 7 is shown in FIG. 8. This electronic equipment comprises a microcomputer 500, an input section 502, a memory 504, a power generation section 506, an image output section 508, and a sound output section 510.

In this case, the input section 502 is designed to input various types of data. The microcomputer 500 performs various types of processing, based on the data that has been input by the input section 502. The memory 504 is used as a work area for the microcomputer 500. The power generation section 506 is designed to create the various power sources used by the electronic equipment. The image output section 508 is designed to output the various images (such as text, icons, and graphics) to be displayed by the electronic equipment, and the functions thereof can be implemented by hardware such as an LCD and CRT. The sound output section 510 is designed to output the various sounds (audio and game sounds) that are to be played by the electronic equipment, and the functions thereof can be implemented by hardware such as a speaker.

Figure 9A:
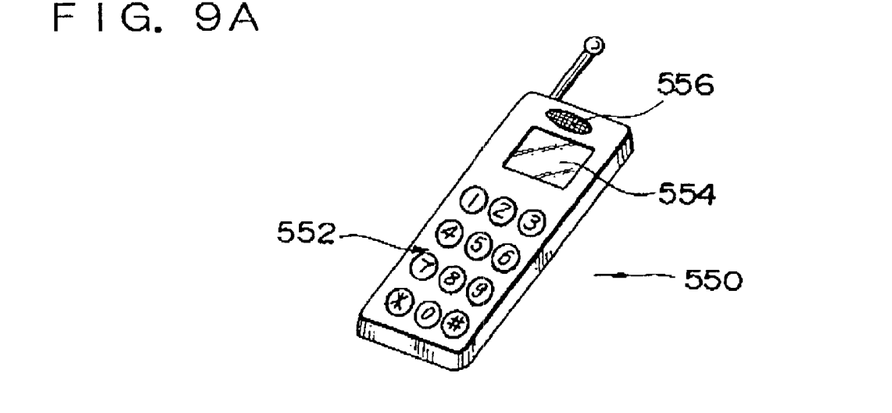
FIGS. 9A, 9B, and 9C show external views of various examples of electronic equipment.

An external view of a portable telephone 550 that is an example of electronic equipment in accordance with the present invention is shown in FIG. 9A. This portable telephone 550 is provided with dial buttons 552 that function as input sections; an LCD screen 554 that functions as an image output section for displaying phone numbers, names, and icons; and a speaker 556 that functions as a sound output section for outputting sounds.

Figure 9B:
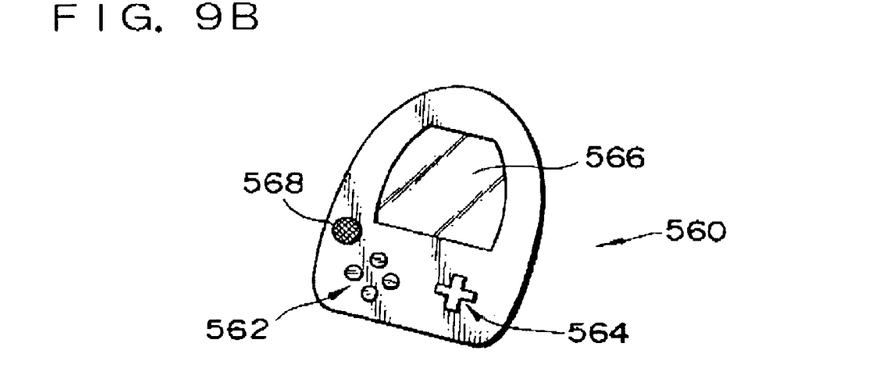

An external view of a portable game machine 560 that is another example of electronic equipment in accordance with the present invention is shown in FIG. 9B. This portable game machine 560 is provided with operating buttons 562 that function as input sections, a cross-shaped control key 564, an LCD screen 566 that functions as an image output section for displaying game images, and a speaker 568 that functions as a sound output section for outputting game sounds.

Figure 9C:
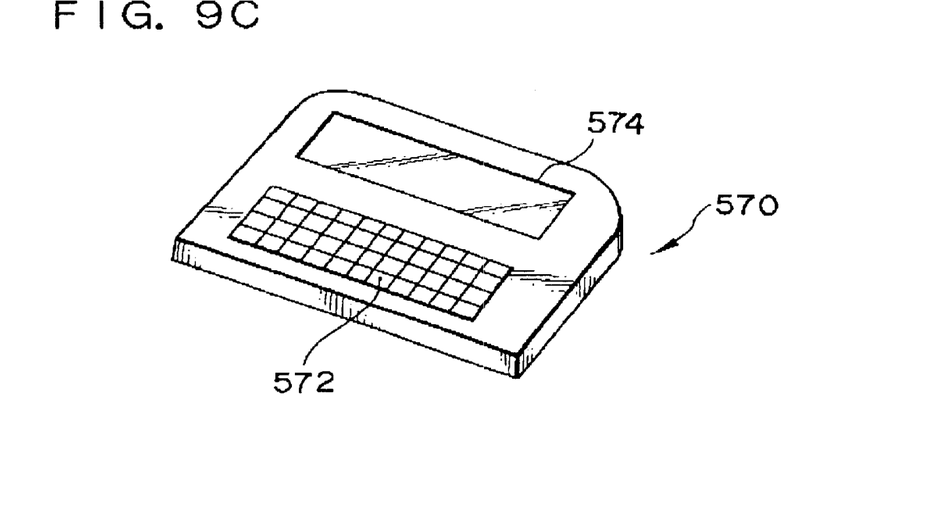

An external view of an electronic notebook 570 that is a further example of electronic equipment in accordance with the present invention is shown in FIG. 9C. This electronic notebook 570 is provided with a keyboard 572 that functions as an input section and an LCD screen 574 that functions as an image output section for displaying images such as text, numerics, and graphics.

The microcomputer of FIG. 7, which uses an interrupt controller in accordance with the present invention, is incorporated in each item of electronic equipment shown in FIGS. 8 to 9C, enabling the advantages described below. When the dial buttons 552 of FIG. 9A are pressed, by way of example, the method of FIG. 1 makes it necessary for the interrupt processing routine 624 to detect the fact that one of those buttons has been pressed, in a software manner. This impedes any increase in speed of the processing and also makes programming more complex. In contrast thereto, the interrupt controller of the present invention ensures that, when one of the dial buttons 552 is pressed, an interrupt processing routine corresponding to the pressed button is activated directly and also immediately. This makes it possible to design for higher processing speeds and also simplify the programming.

Note that various other items of electronic equipment could be considered as the electronic equipment that can make use of this embodiment of the invention, such as portable information terminals, pagers, desktop-calculators, devices employing touch-panels, projectors, dedicated wordprocessors, video tape recorders that use either optical view finders or monitor screens, car navigation devices, and printers, in addition to the examples shown in FIGS. 9A, 9B, and 9C.

Note also that the present invention is not limited to the embodiments described herein, and thus various modifications could be made within the range of the present invention.

For example, the method of determining whether or not the read instruction for the interrupt vector has been executed and the method of generating the vector table address that corresponds to the factor of the external interrupt request are preferably those described with reference to FIGS. 5 and 6, but they are not limited thereto.

The connection between the CPU (processor) and the memory is preferably that shown in FIG. 2, but it is not limited thereto.

In addition, it is particularly preferable to use the method by which the selector is provided in order to select either the AD from the CPU or the VTA from the interrupt controller for output, to minimize signal delays of the address AD during normal operation. However, the present invention can also be applied to a configuration in which this selector is not provided.

Furthermore, the configurations of ASICS and electronic equipment in accordance with the present invention is not limited to those shown in FIGS. 7 to 9C, and thus various modifications are possible.

What is claimed is:

1. An interrupt controller for controlling interrupt, comprising:
   means for generating an interrupt request to a processor when an external interrupt request is received;
   means for trapping an address from the processor, and for determining whether or not the processor which receives the interrupt request has executed a read instruction for an interrupt vector, based on the trapped address; and
   means for generating a vector table address corresponding to a factor of the external interrupt request, with respect to a memory storing an interrupt vector table, when it is determined that the read instruction for the interrupt vector has been executed.

2. The interrupt controller defined in claim 1, wherein the processor and the memory are connected to a higher-performance first bus and the interrupt controller is connected to a lower-performance second bus.

3. An ASIC comprising:
   the interrupt controller as defined in claim 2;
   the processor which executes instructions; and
   the memory which stores at least the interrupt vector table.

4. Electronic equipment comprising:
   the ASIC as defined in claim 3;
   input means for inputting data; and
   output means which outputs at least one of an image and a sound under a control of the ASIC.

5. The interrupt controller defined in claim 1, wherein the interrupt controller generates an address switching signal that is output to a selector, which selector selects and outputs one of the address from the processor and the vector table address from the interrupt controller.

6. An ASIC comprising:
   the interrupt controller as defined in claim 5;
   the processor which executes instructions; and
   the memory which stores at least the interrupt vector table.

7. Electronic equipment comprising:
   the ASIC as defined in claim 6;
   input means for inputting data; and
   output means which outputs at least one of an image and a sound under a control of the ASIC.

8. The interrupt controller defined in claim 1, further comprising a base register which stores a base address of the vector table address,
   wherein the interrupt controller generates the vector table address based on the factor of the external interrupt request and the base address from the base register.

9. An ASIC comprising:
   the interrupt controller as defined in claim 8;
   the processor which executes instructions; and
   the memory which stores at least the interrupt vector table.

10. Electronic equipment comprising:
    the ASIC as defined in claim 9;
    input means for inputting data; and
    output means which outputs at least one of an image and a sound under a control of the ASIC.

11. The interrupt controller defined in claim 1, comprising a first mode and a second mode which are switchable therebetween, processing that traps the address from the processor and generates the vector table address being enabled in the first mode and being disabled in the second mode.

12. An ASIC comprising:

the interrupt controller as defined in claim 11;

the processor which executes instructions; and the memory which stores at least the interrupt vector table.

13. Electronic equipment comprising:

the ASIC as defined in claim 12;

input means for inputting data; and output means which outputs at least one of an image and a sound under a control of the ASIC.

14. An ASIC comprising:

the interrupt controller as defined in claim 1;

the processor which executes instructions; and the memory which stores at least the interrupt vector table.

15. Electronic equipment comprising:

the ASIC as defined in claim 14;

input means for inputting data; and output means which outputs at least one of an image and a sound under a control of the ASIC.

* * * * *